United States Patent Office 3,252,960
Patented May 24, 1966

3,252,960
POLYMERIZATION PROCESS AND PRODUCTS THEREOF
Erik Tornqvist, Roselle, Charles W. Seelbach, Cranford, and Arthur W. Langer, Jr., Watchung, N.J., assignors to Esso Research and Engineering Company, a corporation of Delaware
No Drawing. Original application Apr. 16, 1956, Ser. No. 578,198. Divided and this application June 24, 1963, Ser. No. 290,229
17 Claims. (Cl. 260—93.7)

This application is a division of Serial No. 578,198 filed April 16, 1956, and now Patent No. 3,128,252.

This invention relates to novel polymerization catalysts and polymerization process using these catalysts and to the products derived therefrom. More particularly, it relates to improved modified catalysts comprising an at least partially reduced compound of a reducible heavy metal of Group IV($b$), V($b$), VI($b$) and VIII of the Periodic Table, activated by an organometal compound of a metal Groups II and III of the Periodic Table, and to use of such catalysts for polymerization of propylene and other higher alpha olefins at atmospheric or slightly superatmospheric pressure to make solid polymers, especially those having a substantial proportion of crystalline constituents.

A catalyst has already been prepared by reducing $TiCl_4$ with dry Ti powder, to form $TiCl_3$, in violet crystalline form, containing some free unreacted Ti, and then activating the resulting catalyst constituent with an alkyl metal compound such as aluminum triethyl or aluminum diethyl monochloride. The resulting activated catalyst is quite effective for polymerizing propylene providing a substantial pressure is used such as 50 to 1500 p.s.i.g., usually at least 100 p.s.i.g., and at a temperature of 50 to 100° C. However, little or no polymerization occurs at atmospheric pressure. This is even the case when methods are used which have been found most suitable for atmospheric polymerization of α-olefins using a transition metal halide which has been partially reduced by an alkyl metal compound, preferably to a valence state one unit below the maximal one.

The reasons why the preformed partially reduced transition metal halides, such as $TiCl_3$, do not give high polymerization activity at atmospheric pressure even when a suitable alkyl metal compound is present, seem to be: (a) that the transition metal compound does not become properly dispersed in the polymerization diluent resulting in a very small catalytically active surface area and (b) that the transition metal compound becomes coated with polymer at an early stage which impairs catalyst activity.

These problems can be to a large degree solved by modifying the catalyst.

The main object of this invention is to modify and improve the above mentioned type of catalysts so that the problems described above are not encountered when a process is used which in itself will tend to minimize polymer coating of the catalyst. This can be achieved by incorporating one or more compounds into the catalyst preparation which are soluble in the diluent or diluent-alkyl metal compound mixture used in the polymerization. Such compounds include salts of metals of Groups II and III of the Periodic System, e.g. aluminum, boron, gallium, beryllium, magnesium, zinc and cadmium, Preferably the halides may be used and especially the chlorides and bromides. Useful halides include among others $AlCl_3$, $AlBr_3$, $MgCl_2$, $MgBr_2$, $ZnCl_2$ and $ZnBr_2$. In most cases a halide of the same metal as is present in the organometal compound used for activating the catalyst may be preferentially used, although in some cases a compound of another metal may be the most suitable one.

Some of the type reactions through which these compounds may go into solution in a solvent containing an alkyl metal compound are illustrated below:

(1) $2AlCl_3 + Al$ trialkyl → $3Al$ monoalkyl $Cl_2$
(2) $AlCl_3 + 2Al$ trialkyl → $3Al$ dialkyl $Cl$
(3) $MgCl_2 + Mg$ dialkyl → $2Mg$ alkyl $Cl$
(4) $MgCl_2 + Al$ trialkyl → $Mg$ alkyl $Cl + Al$ dialkyl $Cl$ When the incorporated soluble compound, which may have cocrystallized with the transition metal compound or intimately mixed with it during its preparation, goes into solution a very fine dispersion of the transition metal compound results. This in turn causes a very much increased catalyst activity as compared to a preparation of the pure transition metal compound or its mixture with small amounts of the transition metal itself. However, the incorporation of soluble salts may also have a marked effect on the crystal structure of the reduced transition metal compound, which in turn may influence the properties of the polymers obtained (crystallinity, molecular weight, etc.) and also the relative activity of the catalyst for polymerization of different α-olefins.

According to the invention the incorporation of one or more soluble compounds into the catalyst preparation may be achieved in a number of ways among which there are two fundamental ones.

According to the first of these methods the soluble salt is both formed and incorporated with the reduced transition metal compound during the reduction procedure. This is achieved when the reduction is carried out wholly or in part by a metal or mixtures of metals belonging to Groups II and III of the Periodic System as described above. In this case part of the reduction may be carried out by the transition metal itself. A soluble salt or salt mixture is then formed during the reaction. Depending upon the proportions and type of starting materials used, the soluble salt will either cocrystallize or intimately mix with the reduced transition metal compound. The following equations will illustrate this type of procedure:

(a) $3TiCl_4 + Al → 3TiCl_3 + AlCl_3$
(b) $9TiCl_4 + Ti + 2Al → 10TiCl_3 + 2AlCl_3$
(c) $6TiCl_4 + Ti + Al → 7TiCl_3 + AlCl_3$

The above reactions may be carried out either stoichiometrically or with a slight excess of 0.02 to 0.2 moles of the metal or metals so as to leave some free titanium or aluminum in the final product. In the latter case the reaction conditions must be selected carefully so as to prevent undesirable over reduction of the transition metal compound.

The second basic method of incorporating a soluble salt or salt mixture into the catalyst preparation as described above, is to add the desirable soluble salt before the reduction of the transition metal compound. The reduction may then be carried out by the transition metal itself, together with the free metal of the soluble salt or with another metal of Groups II or III of the Periodic System.

The following equations will illustrate this type of procedure:

(d) $3TiCl_4 + Ti + nAlCl_3 → 4TiCl_3 + nAlCl_3$
(e) $3TiCl_4 + Al + nAlCl_3 → 3TiCl_3 + (n+1)AlCl_3$
(f) $2TiCl_4 + Mg + nAlCl_3 → 2TiCl_3 + MgCl_2 + nAlCl_3$

These reactions may be carried out either stoichiometrically or with a slight excess of the metal or metals used for the reduction so as to leave some free metal in the final product. The proportion between reduced transition metal compound and soluble salt can of course be varied within a wider range with the second basic method than with the first one. However, an almost unlimited variation can be obtained by combining the methods illustrated in Equations a to f.

An important advantage of adding a small amount of certain soluble salts, e.g. $AlCl_3$, $MgCl_2$, before the reduction of the transition metal element is that the reduction then can be carried out at a lower temperature than when no salt has been added. Thus, instead of requiring a temperature of 350°–400° C. as is required for reducing $TiCl_4$ with Al metal in the absence of $AlCl_3$, a suitable temperature range when $AlCl_3$ is used is about 250–350° C. A similar if not always as pronounced decrease in the required reduction temperature also occurs when other metals, e.g. Mg, Zn, Ti, are used for the reduction in the presence of $AlCl_3$, $ZnCl_2$, etc.

The temperature of reduction will vary with each particular combination of compounds used but as a rule the most suitable temperatures are between about 150–600° C., and in most cases between 250–500° C. Naturally there is a minimum temperature that can be employed in each case, although quite often a somewhat higher temperature may give a more desirable product. The optimum reduction temperature will of course be below that at which over reduction or decomposition of the desired reduced transition metal compound takes place. The pressure may be from 1 to 50 atmospheres, preferably from 2 to 30 atmospheres, and the time may vary from a few minutes to 100 hours or more, generally about 1–30 hours, depending, of course, upon the temperature and the types, proportions and amounts of materials used.

The proportions of materials to be used will, of course, depend upon which of the major types of reactions are used in preparing the catalyst, and upon the degree of reduction desired. For instance, in addition to the above reactions (a) to (f) giving relatively mild reduction of a $TiCl_4$ only to $TiCl_3$ one may also reduce the $TiCl_3$ further to $TiCl_2$, or reduce the $TiCl_4$ directly to $TiCl_2$, using some elemental titanium and/or aluminum alone, or together with aluminum halide, or equivalent materials, to assist in the reduction.

When aluminum chloride or equivalent material is used to promote the reduction of $TiCl_4$ by Ti and/or Al, the amount of added $AlCl_3$ should generally be about 1–70 mole percent, preferably sufficient to make a final product containing about 5 to 50 mole percent of $AlCl_3$.

In making the above described reduced transition metal compound, the starting material may be compounds of various other reducible heavy metals other than titanium, e.g. Zr, Hf, V, Nb, Ta, Cr, Mo and W. The heavy metal compounds are preferably in the form of the halides, e.g. $TiCl_4$ or $TiBr_4$, but the invention is not to be limited to the halide derivatives.

After the compound of a reducible heavy metal has thus been reduced as described above, the resulting reduced compound is then activated by an organometal compound of a metal of Groups II and III of the Periodic Table. This may be an aluminum trialkyl, which may have 2 to 20 carbon atoms, preferably 3 to 8 carbon atoms in the alkyl groups, and these alkyl groups may be like or unlike. Also, various aluminum dialkyl monohalides may be used, e.g. aluminum diethyl monochloride, aluminum diethyl monobromide, aluminum ethyl propyl monochloride, aluminum triisobutyl, or other substituted aluminum alkyl compounds such as methoxy aluminum diethyl or derivatives having the general formula $AlR_2X$ where X may be a secondary amine, acid amide, mercaptan, thiophenol, etc., or more broadly other reducing compounds of metals of the second and third groups of the Periodic Table such as zinc and magnesium hydrocarbon halides or zinc and magnesium dialkyl, or -aryl compounds, or any of these compounds together with an alkali metal or alloy, or an alkali metal hydride. In the preferred system, the alkyl group is derived from the olefin to be polymerized.

However, in atmospheric polymerizations alkyl metal compounds containing no halogen, e.g. aluminum trialkyls, magnesium dialkyls, zinc dialkyls, etc. are most suitable. Of these the aluminum trialkyls, e.g. aluminum triethyl, aluminum tripropyl and aluminum triisobutyl are preferred.

In activating the reduced metal compound, e.g., $TiCl_3$, with a metal organic compound, e.g. Al trialkyl, various proportions may be used. For instance, the molar Al/Ti ratio of these two constituents may range from 0.1 to 20, preferably about 1 to 10 mols of the Al trialkyl, or other organometal compound per mol of $TiCl_3$ or other partially reduced heavy metal compound.

For atmospheric polymerizations, the optimal molar ratio of alkyl metal compound to reduced transition metal compound normally depends upon the amount of soluble salt present in the catalyst preparation. In the specific case of a $TiCl_3$ preparation containing cocrystallized $AlCl_3$, the Al trialkyl will react with the $AlCl_3$ until all of the latter has been converted into $AlR_2Cl$ and has gone into solution. This of course causes the desired fine or even colloidal dispersion of the $TiCl_3$. As aluminum dialkyl halides show little or no activation of the catalyst at atmospheric pressure, enough Al trialkyl must be added so that it can convert the $AlCl_3$ to $AlR_2Cl$ and leave an additional amount to activate the $TiCl_3$ catalyst.

The following type formula will show this more clearly:

$TiCl_3 + AlCl_3 + (n+2)AlEt_3 \rightarrow TiCl_3 + 3AlEt_2Cl + nAlEt_3$

In this case $n$ must have a value above 0 preferably 1 or higher. This is of course true, also, for other combinations of reduced Ti halides, Al halides and Al trialkyl compounds. To a certain extent it also applies to other transition metal elements and metal organic compounds used in this invention.

The preparation of the activated catalyst may be carried out in any desired manner, e.g. by adding a solution of the aluminum triethyl dissolved in a suitable solvent to a suspension of the reduced $TiCl_4$ catalyst constituent at a suitable temperature ranging from 0 to 100° C. but preferably about 20 to 40° C., preferably with agitation to maintain the activated catalyst in a desired state of fine solid dispersion in the inert diluent.

The resulting activated dispersed catalyst is then ready for use in polymerizing propylene or other suitable olefins. This is preferably carried out by adding the olefin, in either gaseous or liquid state, directly to the reactor containing the dispersed catalyst, preferably with constant agitation, the temperature being maintained within the range of about 0 to 150° C., normally about 60 to 120° C. The pressure is preferably atmospheric, or slightly above atmospheric, e.g. up to 10 atmospheres or so.

The olefin to be polymerized should be one having the general formula $R-CH=CH_2$ in which R is a saturated hydrocarbon group of 1 to 20 carbon atoms, preferably 1 to 5 or 6 carbon atoms. Thus, the olefin monomer may be propylene, butene-1, hexene-1, octadecene-1, etc.

Although the exact mechanism of the operation of the catalyst and polymerization of this invention are not known with certainty, it is clear that the preparation of reduced transition metal compounds according to our invention will result in a very great improvement of the dispersion of these compounds in the final catalyst preparation. This in turn results in greatly improved catalyst activity for polymerization of α-olefins at atmospheric pressure. This catalyst preparation technique may also result in better orientation of the olefin monomer at or near the surface of the activated solid catalyst, whereby the polymerization is facilitated.

In addition, has been previously stated, the incorporation of soluble salts may also have a marked effect on the crystal structure of the reduced transition metal compound, which in turn may influence the properties of the polymers obtained.

The details and advantages of the invention will be better understood from consideration of the following experimental data:

EXAMPLE I 142.2 g. purified TiCl₄, 12.0 g. dry Ti powder, and 26.7 g. anhydrous AlCl₃ were charged into a 300 ml. steel bomb. The closed bomb was then placed in a rocker and heated to 400° C. for 24 hours. After cooling, the bomb was opened and an almost quantitative yield of a violet-purple preparation containing TiCl₃ and AlCl₃ in a mole ratio of 5/1 was recovered. The preparation was microcrystalline and formed a fairly hard cake. It was, however, much more easily pulverized than a preparation consisting of AlCl₃-free TiCl₃.

EXAMPLE II 94.9 g. purified TiCl₄, 4.49 g. granular Al metal, and 44.5 g. anhydrous AlCl₃ were charged into a bomb as described in Example I. The reaction was carried out at 380° C. for 24 hours. An almost quantitative yield of a product containing TiCl₃ and AlCl₃ in the mole ratio 1/1 was obtained. The preparation was slightly lighter in color than the preparation described in Example I. It was also somewhat easier to pulverize.

EXAMPLE III 142.2 g. (¾ mole) TiCl₄, 3.98 g. (1/12 atom) Ti and 4.49 g. (⅙ atom) Al were charged into a dry 300 ml. bomb. The bomb was placed in a rocker and heated to 435° C. for 24 hours. After cooling down and opening the bomb, an almost quantitative yield of a violet-purple homogeneous mixture of TiCl₃ and AlCl₃ in the mole ratio 5/1 was obtained. The product had the same composition as that one obtained in Example I and appeared similar with respect to appearance and polymerization activity. The product was microcrystalline and more easily powderized than the pure TiCl₃ prepared by reducing TiCl₄ with Ti in a similar fashion. The improved catalyst activity as compared to the pure TiCl₃ is shown in Table I.

*Table I*

BATCH POLYMERIZATION OF PROPYLENE IN XYLENE USING PREFORMED TiCl₃ CATALYSTS (ᵃ)

| Catalyst preparation | TiCl₃ (ᵇ) | Ex. II | Ex. III |
|---|---|---|---|
| TiCl₃ in catalyst, g. | 1.54 | 1.54 | 1.54 |
| AlEt₃/TiCl₃ mole ratio (ᶜ) | 3 | 3 | 2 |
| Total catalyst, g. (ᵈ) | 4.96 | 5.16 | 4.09 |
| Catalyst dispersion | Fair | Very Good | Very Good |
| Polymerization starts at, °C | 80 | 52 | 60 |
| Temp. of max. polymerization rate, °C | 105 | 100 | 102 |
| Polymerization time, hrs | 4 | 1.5 | 3 |
| Total yield of solid polymers, g | 49 | 62 | 242 |
| Highest polymerization rate, g. polymer/g. cat./hr. (ᵉ) | 5 | 14 | 23 |
| Polymer properties: | | | |
| Intrinsic viscosity | 2.15 | 1.72 | 2.30 |
| Molecular weight × 10⁻³ (ᶠ) | 125 | 87 | 140 |
| Percent heptane insoluble (ᵍ) | 91 | 90.6 | 89.2 |

ᵃ The polymerizations were carried out as follows:
The catalyst (TiCl₃ preparation+triethylaluminum) components were added together with 100 ml. dry xylene to the reactor and stirred for about 40 minutes at room temperature. 250 ml. dry xylene was then added and the gaseous propylene feed started. The temperature was then slowly raised (over a period of about 2 hours) until maximum polymerization rate was obtained. More xylene was added as needed for good stirring.
ᵇ Made by reduction of TiCl₄ with Ti but no AlCl₃ present. The product contained some free Ti.
ᶜ The AlEt₃/TiCl₃ mole ratio did not seem to be too important as long as so much AlEt₃ had been added that 1 mole of AlEt₃ remained in the solution for each mole of TiCl₃ after the rest of it had reacted with the AlCl₃ present to form AlEt₂Cl. Thus, an AlEt₃/TiCl₃ mole ratio of 3 was the minimum for the catalyst from Example II.
ᵈ Includes AlCl₃.
ᵉ This is the most significant figure, as the catalysts normally will retain their activity over a long polymerization time and thus give high over-all efficiencies.
ᶠ According to the Harris relationship (J. Polymer Sc. 8, 361 (1952)).
ᵍ 24 hour Soxhlet extraction.

Thus the data in the above three examples show that the new catalysts of this invention are extremely effective to polymerize propylene very rapidly to very high molecular weight product almost completely crystalline (heptane-insoluble) in character, and that this polymerization can be carried out effectively at atmospheric pressure, which is a great advantage over prior processes which required the use of substantial pressure.

It is not intended that this invention be limited to the specific examples and modifications which have been given merely for the sake of illustration, but only by the appended claims, in which it is intended to claim all novelty inherent in the invention as well as all modifications coming within the scope and spirit of the invention.

What is claimed is:

1. A process for the preparation of a solid crystalline polymer of an alpha olefin having at least three carbon atoms which comprises: contacting said alpha olefin with a catalyst comprising
   (a) a reduced halide of a transition metal of Groups IV, V, VI and VIII complexed with a halide of a metal of Groups II–III, and
   (b) a Group II–III metal alkyl compound.

2. The process of claim 1 wherein the alpha olefin is propylene.

3. The process of claim 2 wherein the transition metal is titanium.

4. The process of claim 3 wherein the metal of the metal halide is aluminum.

5. The process of claim 4 wherein the metal alkyl is aluminum triethyl.

6. The process of claim 5 wherein 1 to 10 moles of aluminum triethyl is utilized per mole of titanium halide.

7. The process of claim 6 wherein the titanium halide in TiCl₃ and the aluminum halide is AlCl₃.

8. A process for the preparation of a solid crystalline polymer of an alpha olefin of the formula R—CH=CH₂ in which R is a saturated hydrocarbon group of 1 to 20 carbon atoms which comprises: contacting said alpha olefin with a catalyst composition prepared by
   (a) reducing a halide of a transition metal of Groups IV, V, VI and VIII of the Periodic Table with a reducing agent selected from the group consisting of (1) a metal of Groups II–III, (2) a mixture of at least two metals of Groups II–III, (3) a mixture of the transition metal corresponding to the transition metal in the transition metal halide and a halide of a metal of Groups II–III, (4) a mixture of the transition metal corresponding to the transition metal in the transition metal halide and a metal of Groups II–III, and (5) a mixture of a metal of Groups II–III and a halide of a metal of Groups II–III; to form a solid catalyst component, said solid catalyst component comprising a reduced halide of said transition metal intimately associated with a halide of a metal of Groups II–III,
   (b) adding to the resulting product a Group II–III metal alkyl compound.

9. The process of claim 8 wherein the transition metal is titanium.

10. The process of claim 9 wherein the Groups II–III metal is aluminum.

11. The process of claim 10 wherein the alpha olefin is propylene.

12. The process of claim 11 wherein the metal alkyl compound is aluminum triethyl.

13. A method for polymerizing propylene to a solid polymer which comprises contacting propylene with a catalyst comprising (1) an organoaluminum compound corresponding to the general formula AlR₃, wherein R is an aklyl group and (2) the reaction product obtained by reacting aluminum with titanium tetrachloride.

14. The method of claim 13 wherein R is a $C_2$-$C_{20}$ alkyl group.

15. The method of claim 13 wherein $AlR_3$ is aluminum triethyl.

16. The method of claim 13 wherein $AlR_3$ is aluminum tripropyl.

17. The method of claim 13 wherein $AlR_3$ is aluminum triisobutyl.

No references cited.

JOSEPH L. SCHOFER, *Primary Examiner.*